(12) United States Patent
Bigontina et al.

(10) Patent No.: US 11,574,416 B2
(45) Date of Patent: *Feb. 7, 2023

(54) GENERATING BODY POSE INFORMATION

(71) Applicant: Apple Inc., Cupertino, CA (US)

(72) Inventors: Andreas N. Bigontina, San Jose, CA (US); Behrooz Mahasseni, San Jose, CA (US); Gutemberg B. Guerra Filho, El Dorado Hills, CA (US); Saumil B. Patel, San Jose, CA (US); Stefan Auer, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/242,879

(22) Filed: Apr. 28, 2021

(65) Prior Publication Data

US 2021/0312662 A1 Oct. 7, 2021

Related U.S. Application Data

(63) Continuation of application No. 16/579,791, filed on Sep. 23, 2019, now Pat. No. 11,062,476.

(Continued)

(51) Int. Cl.
*G06T 7/73* (2017.01)
*G06T 13/40* (2011.01)
*G06T 13/80* (2011.01)
*G06F 3/01* (2006.01)
*G06N 3/04* (2006.01)

(52) U.S. Cl.
CPC ............... *G06T 7/75* (2017.01); *G06F 3/011* (2013.01); *G06T 13/40* (2013.01); *G06T 13/80* (2013.01); *G06N 3/0454* (2013.01); *G06T 2207/20076* (2013.01); *G06T 2207/20081* (2013.01); *G06T 2207/20084* (2013.01); *G06T 2207/30196* (2013.01)

(58) Field of Classification Search
CPC . G06T 7/75; G06T 13/40; G06T 2207/20081; G06T 2207/30196; G06F 3/011
See application file for complete search history.

(56) References Cited

U.S. PATENT DOCUMENTS 5,461,711 A * 10/1995 Wang ..................... G06F 3/016
345/173
10,304,208 B1 * 5/2019 Chandler ................ G06F 3/017
(Continued)

*Primary Examiner* — King Y Poon
*Assistant Examiner* — Vincent Peren
(74) *Attorney, Agent, or Firm* — Fernando & Partners, LLP

(57) ABSTRACT

A method includes obtaining a set of images that correspond to a person. The method includes generating a body pose model of the person defined by a branched plurality of neural network systems. Each neural network system models a respective portion of the person between a first body-joint and a second body-joint as dependent on an adjacent portion of the person sharing the first body-joint. Providing the set of images of the respective portion to a first one and a second one of the neural network systems. The first one and second one correspond to adjacent body portions. The method includes determining, jointly by at least the first one and second one of the plurality of neural network systems pose information for the first respective body-joint and the second respective body-joint.

25 Claims, 10 Drawing Sheets

Related U.S. Application Data

(60) Provisional application No. 62/735,780, filed on Sep. 24, 2018.

(56) References Cited

U.S. PATENT DOCUMENTS

| | | | |
|---|---|---|---|
| 2003/0223078 A1* | 12/2003 | Doren | G01B 9/02021 |
| | | | 356/498 |
| 2013/0230211 A1 | 9/2013 | Tanabiki et al. | |
| 2018/0307899 A1* | 10/2018 | Das | G06V 40/10 |
| 2019/0171871 A1 | 6/2019 | Zhang et al. | |
| 2019/0272620 A1* | 9/2019 | Seip | G06T 3/4046 |
| 2019/0369715 A1* | 12/2019 | Erivantcev | G06V 40/23 |
| 2019/0379819 A1 | 12/2019 | Shimada | |

* cited by examiner

GENERATING BODY POSE INFORMATION

CROSS REFERENCE TO RELATED APPLICATIONS

This application is a continuation application of and claims priority to U.S. patent application Ser. No. 16/579,791, filed on Sep. 23, 2019, which claims priority to U.S. patent application No. 62/735,780, filed on Sep. 24, 2018, which are hereby incorporated by reference in their entirety.

TECHNICAL FIELD

The present disclosure generally relates to generating body pose information.

BACKGROUND

Some devices are capable of presenting computer-generated reality (CGR) experiences. For example, some head-mountable devices (HMDs) present immersive CGR experiences to a user of the HMD. Some CGR experiences require knowing a body pose of the user. For example, some CGR experiences present an avatar of the user that mimics the behavior of the user. If the user moves a portion of his/her body, the avatar moves the corresponding portion. In such CGR experiences, presenting accurate avatars requires knowing a body pose of the user. In some CGR experiences, the CGR experience is altered based on the body pose of the user. For example, as the user moves, the scene being presented in the CGR experience changes. In such CGR experiences, providing a realistic CGR experience requires knowing a body pose of the user.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
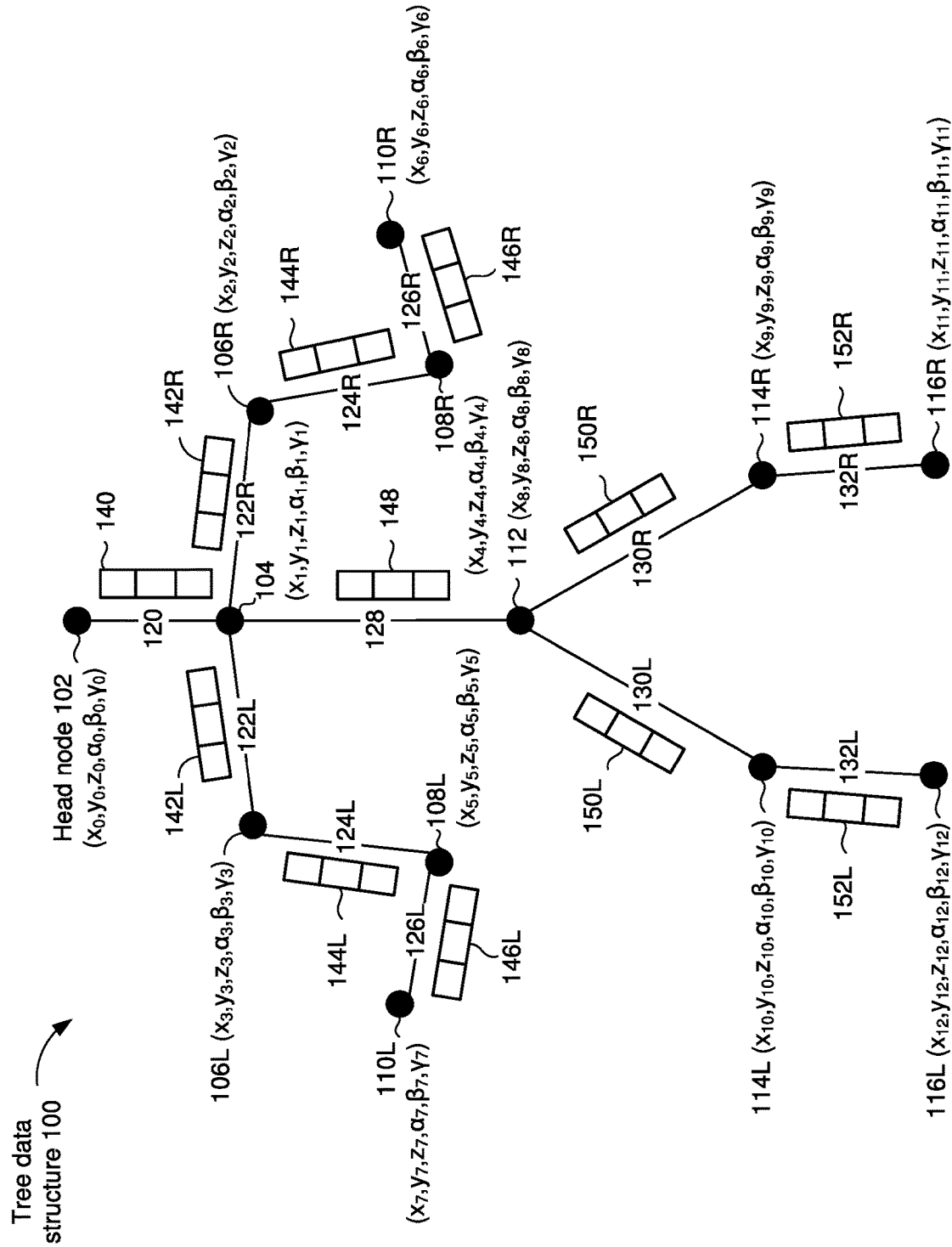
FIG. 1A is a diagram of an example tree data structure in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating body pose information for a person. In various implementations, a device includes a non-transitory memory and one or more processors coupled with the non-transitory memory. In some implementations, the method includes obtaining, by the device, a set of images that correspond to a person. In some implementations, the method includes generating a body pose model of the person defined by a branched plurality of neural network systems. In some implementations, each of the branched plurality of neural network systems models a respective portion of the person between a first respective body-joint and a second respective body-joint as dependent on at least an adjacent portion of the person sharing the first respective body-joint. In some implementations, the method includes providing the set of images of the respective portion to a first one of the branched plurality of neural network systems and a second one of the branched plurality of neural network systems. In some implementations, the first one and second one correspond to adjacent body portions. In some implementations, the method includes determining, jointly by at least the first one and second one of the plurality of neural network systems pose information for the first respective body-joint and the second respective body-joint.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

The present disclosure provides methods, systems, and/or devices that enable generation of body pose information for a person. The present disclosure utilizes a set of images to determine the body pose information. The body pose information indicates a current body pose of the person. The body pose information includes positions and/or angles of various joints of the person. The body pose information also indicates positions and/or angles of various body portions such as the neck, the torso, the arms, and the legs of the person.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1A is a diagram of an example tree data structure 200 in accordance with some implementations. In various implementations, a device (e.g., the device 400 shown in FIG. 4) utilizes the tree data structure 200 to model a person. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the tree data structure 100 includes various nodes that represent respective body joints of a person, and various edges that represent respective body portions of the person.

In various implementations, the tree data structure 100 includes a head node 102 (e.g., a root node) that represents a head of a person. In the example of FIG. 1A, the tree data structure 100 includes a collar region node 104 that represents a collar region of the person. In some implementations, the tree data structure 100 includes a right shoulder node 106R that represents a right shoulder joint of the person. In some implementations, the tree data structure 100 includes a left shoulder node 106L that represents a left shoulder joint of the person. In some implementations, the tree data structure 100 includes a right elbow node 108R that represents a right elbow joint of the person. In some implementations, the tree data structure 100 includes a left elbow node 108L that represents a left elbow joint of the person. In some implementations, the tree data structure 100 includes a right wrist node 110R that represents a right wrist joint of the person. In some implementations, the tree data structure 100 includes a left wrist node 110L that represents a left wrist joint of the person. In some implementations, the tree data structure 100 includes a pelvic node 112 that represents a pelvic joint of the person. In some implementations, the tree data structure 100 includes a right knee node 114R that represents a right knee joint of the person. In some implementations, the tree data structure 100 includes a left knee joint 114L that represents a left knee joint of the person. In some implementations, the tree data structure 100 includes a right ankle node 116R that represents a right ankle joint of the person. In some implementations, the tree data structure 100 includes a left ankle node 116L that represents a left ankle joint of the person.

In various implementations, the tree data structure 100 includes various edges that represent different portions of the person. For example, in some implementations, the tree data structure 100 includes a neck edge 120 that represents a neck of the person. In some implementations, the tree data structure 100 includes a right shoulder edge 122R that represents a right shoulder of the person. In some implementations, the tree data structure 100 includes a left shoulder edge 122L that represents a left shoulder of the person. In some implementations, the tree data structure 100 includes a right upper arm edge 124R that represents a right upper arm of the person. In some implementations, the tree data structure 100 includes a left upper arm edge 124L that represents a left upper arm of the person. In some implementations, the tree data structure 100 includes a right lower arm edge 126R that represents a right lower arm of the person. In some implementations, the tree data structure 100 includes a left lower arm edge 126L that represents a left lower arm of the person. In some implementations, the tree data structure 100 includes a torso edge 128 that represents a torso of the person. In some implementations, the tree data structure 100 includes a right upper leg edge 130R that represents a right upper leg of the person. In some implementations, the tree data structure 100 includes a left upper leg edge 130L that represents a left upper leg of the person. In some implementations, the tree data structure 100 includes a right lower leg edge 132R that represents a right lower leg of the person. In some implementations, the tree data structure 100 includes a left lower leg edge 132L that represents a left lower leg of the person. In some implementations, the tree data structure 100 includes edges for the hands and the feet.

In various implementations, a device (e.g., the device 400 shown in FIG. 4) generates a body pose model that includes a branched set of neural network systems ("neural networks", hereinafter for the sake of brevity). In some implementations, each of the branched set of neural networks models a respective portion of the person between two joints. For example, in some implementations, the body pose model includes a neck neural network 140 that models the neck of the person. In some implementations, the body pose model includes a right shoulder neural network 142R that models the right shoulder of the person. In some implementations, the body pose model includes a left shoulder neural network 142L that models the left shoulder of the person. In some implementations, the body pose model includes a right upper arm neural network 144R that models the right upper arm of the person. In some implementations, the body pose model includes a left upper arm neural network 144L that models the left upper arm of the person. In some implementations, the body pose model includes a right lower arm neural network 146R that models the right lower arm of the person. In some implementations, the body pose model includes a left lower arm neural network 146L that models the left lower arm of the person. In some implementations, the body pose model includes a torso neural network 148 that models the torso of the person. In some implementations, the body pose model includes a right upper leg neural network 150R that models the right upper leg of the person. In some implementations, the body pose model includes a left upper leg neural network 150L that models the left upper leg of the person. In some implementations, the body pose model includes a right lower leg neural network 152R that models the right lower leg of the person. In some implementations, the body pose model includes a left lower leg neural network 152L that models the left lower leg of the person.

In various implementations, each node of the tree data structure 100 is associated with a position and an orientation. To that end, each node is associated with a set of position coordinates (e.g., x, y and z), and a set of angular coordinates (e.g., $\alpha$, $\beta$ and $\gamma$). For example, the head node 102 is associated with a set of position coordinates $(x_0, y_0, z_0)$, and a set of angular coordinates $(\alpha_0, \beta_0, \gamma_0)$. In the example of FIG. 1A, the collar region node 104, the right shoulder node 106R, the left shoulder node 106L, the right elbow node 108R, the left elbow node 108L, the right wrist node 110R, the left wrist node 110L, the pelvic node 112, the right knee node 114R, the left knee node 114L, the right ankle node 116R and the left ankle node 116L are associated with the set of position coordinates $(x_1, y_1, z_1)$, $(x_2, y_2, z_2)$, $(x_3, y_3, z_3)$, $(x_4, y_4, z_4)$, $(x_5, y_5, z_5)$, $(x_6, y_6, z_6)$, $(x_7, y_7, z_7)$, $(x_8, y_8, z_8)$, $(x_9, y_9, z_9)$, $(x_{10}, y_{10}, z_{10})$, and $(x_{11}, y_{11}, z_{11})$, respectively. In the example of FIG. 1A, the collar region node 104, the right shoulder node 106R, the left shoulder node 106L, the right elbow node 108R, the left elbow node 108L, the right wrist node 110R, the left wrist node 110L, the pelvic node 112, the right knee node 114R, the left knee node 114L, the right ankle node 116R and the left ankle node 116L are associated with the set of angular coordinates $(\alpha_1, \beta_1, \gamma_1)$, $(\alpha_2, \beta_2, \gamma_2)$, $(\alpha_3, \beta_3, \gamma_3)$, $(\alpha_4, \beta_4, \gamma_4)$, $(\alpha_5, \beta_5, \gamma_5)$, $(\alpha_6, \beta_6, \gamma_6)$, $(\alpha_7, \beta_7, \gamma_7)$, $(\alpha_8, \beta_8, \gamma_8)$, $(\alpha_9, \beta_9, \gamma_9)$, $(\alpha_{10}, \beta_{10}, \gamma_{10})$, and $(\alpha_{11}, \beta_{11}, \gamma_{11})$, respectively. In some implementations, the position/orientation of a joint is expressed in relation to the position/orientation of the head. For example, in some implementations, the position/orientation of the right shoulder node 106R is expressed in relation to the position/orientation of the head node 102.

In some implementations, each neural network determines pose information (e.g., position/orientation) for the body portion that the neural network models. For example, in some implementations, the neck neural network 140 determines pose information (e.g., position/orientation) for the neck of the person. Similarly, in some implementations, the torso neural network 148 determines pose information (e.g., position/orientation) for the torso of the person. In some implementations, the neural networks obtain images of the person, and utilize the images of the person to determine the pose information (e.g., position/orientation) of various portions of the person. In some implementations, the neural networks determine the set of position coordinates and/or the set of angular coordinates based on the images of the person.

In some implementations, a neural network determines the pose information for the body portion that the neural network models based on pose information from other upstream neural networks. For example, the torso neural network 148 determines pose information for the torso based on the pose information for the neck determined by the neck neural network 140. As another example, the right lower arm neural network 146R determines pose information for the right lower arm based on the pose information for the right upper arm determined by the right upper arm neural network 144R, the pose information for the right shoulder determined by the right shoulder neural network 142R, and the pose information for the neck determined by the neck neural network 140. In various implementations, a neural network determines the pose information for the body portion that the neural network models based on pose information for an adjacent body portion (e.g., an upstream body portion, for example, a body portion towards the head). In various implementations, a neural network determines the pose information for the body portion that the neural network models based on pose information for multiple upstream body portions (e.g., based on pose information for all upstream body portions).

Figure 1B:
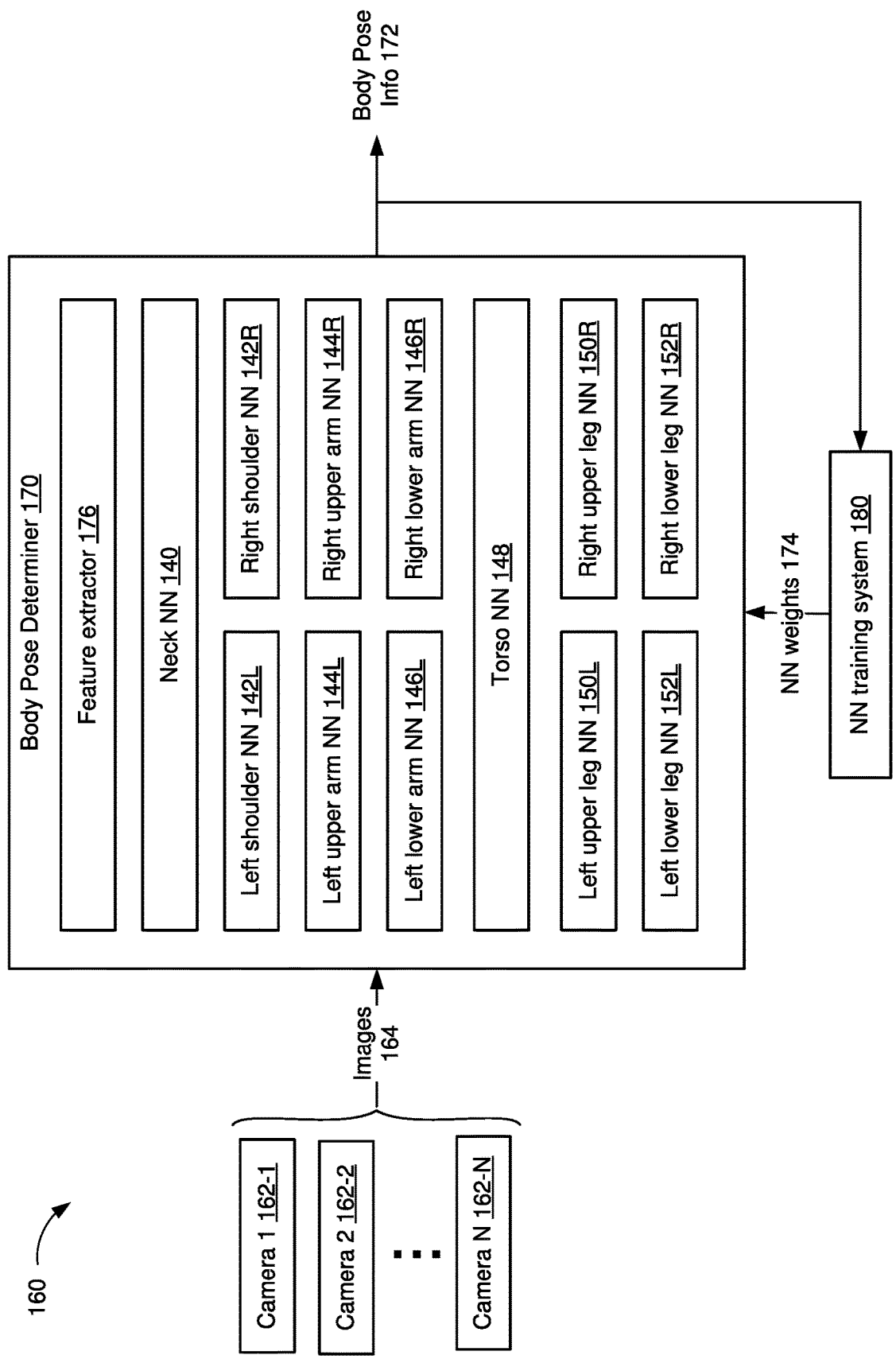
FIG. 1B is a block diagram of an example body pose determiner in accordance with some implementations.

FIG. 1B is a block diagram of an example system 160 for determining pose information for a person. To that end, the system 160 includes cameras 162-1, 162-2 ... 162-N, a body pose determiner 170, and a neural network training system 180. In various implementations, the cameras 162-1, 162-2 ... 162-N provide images 164 to the body pose determiner 170, the body pose determiner 170 determines body pose information 172 based on the images 164, and the neural network training system 180 trains neural networks that the body pose determiner 170 utilizes.

In some implementations, the cameras 162-1, 162-2 ... 162-N are part of different devices. For example, in some implementations, the cameras 162-1, 162-2 ... 162-N are dispersed throughout the scene. In some implementations, the cameras 162-1, 162-2 ... 162-N are attached to different parts of a person's body. For example, in some implementations, the camera 162-1 is attached to a head-mountable device that is worn around the head of the user, and the camera 162-2 is attached to a foot of the user. In various implementations, the cameras 162-1, 162-2 ... 162-N generate the images 164, and provide the images 164 to the body pose determiner 170.

In various implementations, the body pose determiner 170 determines body pose information 172 for a person. In some implementations, the body pose determiner 170 estimates the body pose information 172 for a person. As such, in some implementations, the body pose determiner 170 is referred to as a body pose estimator. In the example of FIG. 2B, the body pose determiner 170 includes a feature extractor 176 and the branched set of neural networks 140 ... 152-R. In some implementations, the feature extractor 176 extracts various features from the images 164, and provides the features to the branched set of neural networks 140 ... 152R in the form of a feature vector (e.g., the feature vector 202 shown in FIG. 2A). In various implementations, the branched set of neural networks 140 ... 152-R receive the feature vector as an input, and determine the body pose information 172 based on the feature vector.

In various implementations, neural network training system 180 trains the branched set of neural networks 140 ... 152R during a training phase. For example, in some implementations, the neural network training system 180 determines neural network weights 174, and provides the neural network weights 174 to the branched set of neural networks 140 ... 152R. In some implementations, the neural network training system 180 utilizes validated training data to determine the neural network weights 174 and trains the neural networks 140 ... 152R. For example, in some implementations, the neural network training system 180 has access to labeled body poses. In such implementations, the neural network training system 180 utilizes the labeled body poses to train the neural networks 140 ... 152R, and determines the neural network weights 174. In some implementations, the neural network training system 180 utilizes the body pose information 172 generated by the body pose determiner 170 in order to adjust the neural network weights 174. As such, in some implementations, the neural network training system 180 continuously/periodically re-calibrates the neural networks 140 ... 152R so that the body pose information 172 generated by the body pose determiner 170 is within a degree of accuracy.

While the example of FIG. 1B illustrates a particular number of neural networks, a person of ordinary skill in the art will appreciate from the present disclosure that, in some implementations, the body pose determiner 170 includes fewer or additional neural networks. For example, in some implementations, the body pose determiner 170 includes a right hand neural network that models the right hand of the person, a left hand neural network that models the left hand of the person, a right foot neural network that models the right foot of the person, and/or a left foot neural network that models the left foot of the person.

Figure 2A:
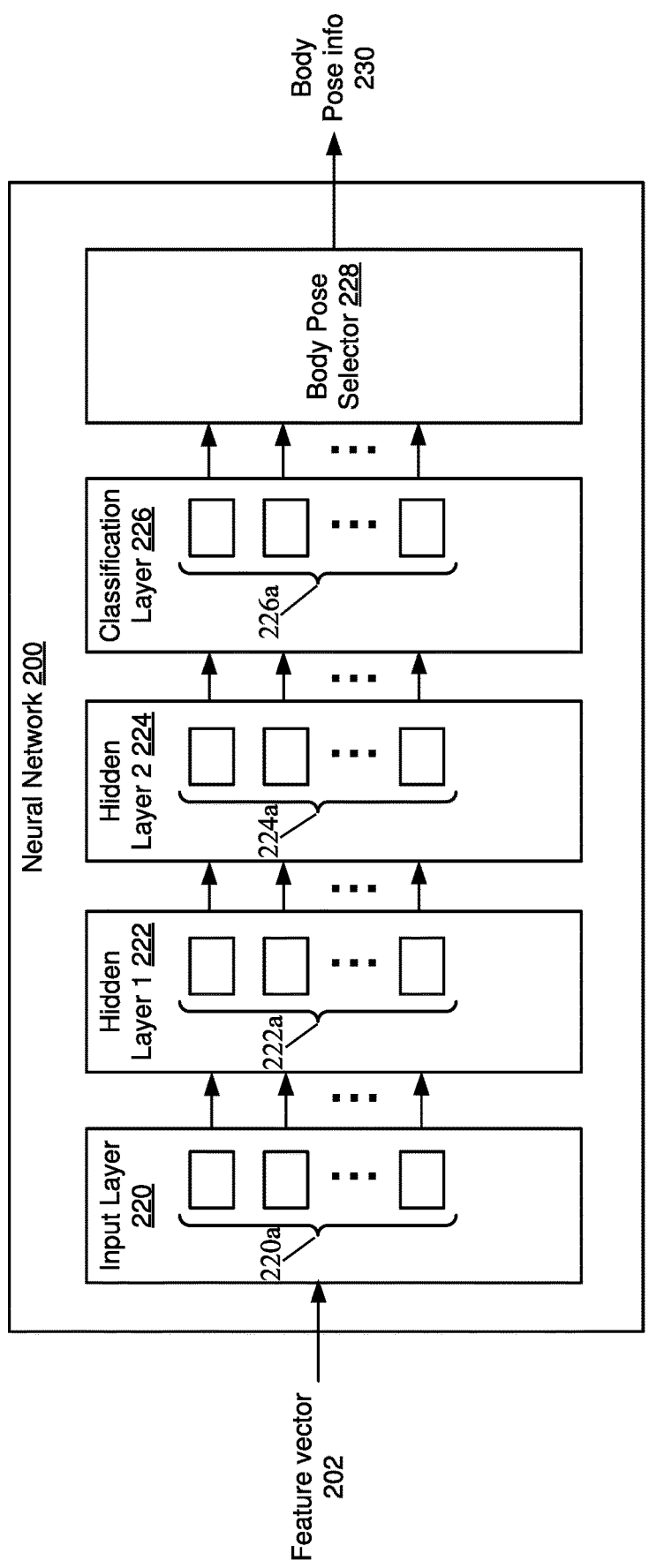
FIGS. 2A-2B are block diagrams of example neural network systems in accordance with some implementations.
Figure 2B:
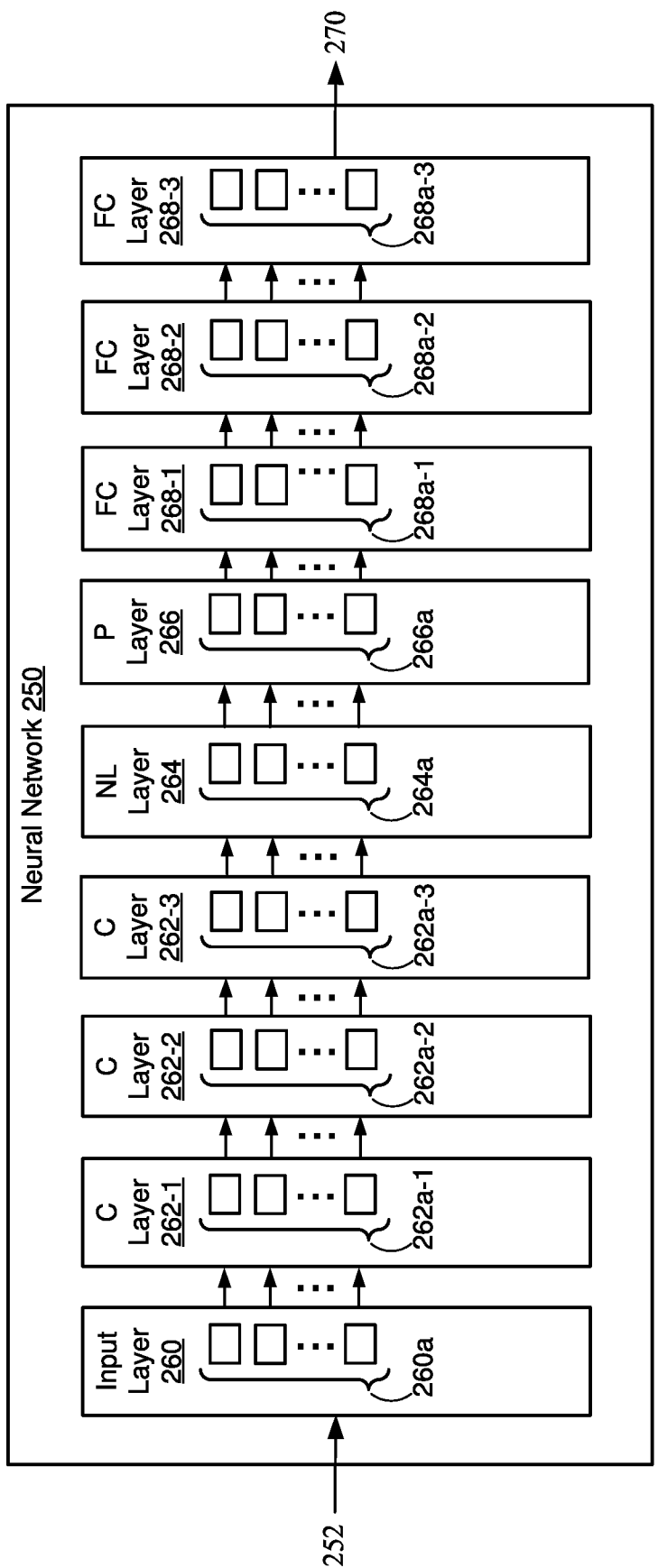

FIG. 2A is a block diagram of a neural network 200 in accordance with some implementations. In some implementations, the neural network 200 implements each of the branched set of neural networks 140 . . . 152R shown in FIGS. 1A and 1B. In various implementations, the neural network 200 receives a feature vector 202, and generates body pose information 230 (e.g., the body pose information 172 shown in FIG. 1B) based on the feature vector 202.

In the example of FIG. 2A, the neural network 200 includes an input layer 220, a first hidden layer 222, a second hidden layer 224, a classification layer 226, and a body pose selector 228. While the neural network 200 includes two hidden layers as an example, those of ordinary skill in the art will appreciate from the present disclosure that one or more additional hidden layers are also present in various implementations. Adding additional hidden layers adds to the computational complexity and memory demands, but may improve performance for some applications.

In various implementations, the input layer 220 is coupled to receive various inputs. In some implementations, the input layer 220 receives the feature vector 202 as input. In some implementations, the input layer 220 receives images as input (e.g., the images 164 shown in FIG. 1B). In some such implementations, the input layer 220 generates the feature vector 202 based on the images. In various implementations, the input layer 220 includes a number of long short term memory (LSTM) logic units 220a, which are also referred to as neurons by those of ordinary skill in the art. In some such implementations, an input matrix from the features of the feature vector 202 to the LSTM logic units 220a include rectangular matrices. The size of a matrix is a function of the number of features included in the feature stream.

In some implementations, the first hidden layer 222 includes a number of LSTM logic units 222a. In some implementations, the number of LSTM logic units 222a ranges between approximately 10-500. Those of ordinary skill in the art will appreciate that, in such implementations, the number of LSTM logic units per layer is orders of magnitude smaller than previously known approaches (being of the order of $O(10^1)$-$O(10^2)$), which allows such implementations to be embedded in highly resource-constrained devices. As illustrated in the example of FIG. 2A, the first hidden layer 222 receives its inputs from the input layer 220.

In some implementations, the second hidden layer 224 includes a number of LSTM logic units 224a. In some implementations, the number of LSTM logic units 224a is the same as or similar to the number of LSTM logic units 220a in the input layer 220 or the number of LSTM logic units 222a in the first hidden layer 222. As illustrated in the example of FIG. 2A, the second hidden layer 224 receives its inputs from the first hidden layer 222. Additionally or alternatively, in some implementations, the second hidden layer 224 receives its inputs from the input layer 220.

In some implementations, the classification layer 226 includes a number of LSTM logic units 226a. In some implementations, the number of LSTM logic units 226a is the same as or similar to the number of LSTM logic units 220a in the input layer 220, the number of LSTM logic units 222a in the first hidden layer 222, or the number of LSTM logic units 224a in the second hidden layer 224. In some implementations, the classification layer 226 includes an implementation of a multinomial logistic function (e.g., a soft-max function) that produces a number of outputs that is approximately equal to a number of possible body poses. In some implementations, each output includes a probability or a confidence measure for the corresponding body pose.

In some implementations, the body pose selector 228 generates the body pose information 230 by selecting the top N body pose candidates provided by the classification layer 226. In some implementations, the body pose selector 228 selects the top body pose candidate provided by the classification layer 226. For example, in some implementations, the body pose selector 228 selects the body pose candidate that is associated with the highest probability of confidence measure. In some implementations, the body pose information 230 is transmitted to another device, so that the other device(s) can utilize the body pose information 230 to present an avatar with the body pose indicated by the body pose information 230.

In some implementations, the body pose information 230 is provided to another neural network that utilizes the body pose information 230 to determine additional body pose information. For example, referring to the example of FIG. 1A, in some implementations, the neck neural network 140 provides body pose information regarding the neck to the right/left shoulder neural networks 142R/142L so that the right/left shoulder neural networks 142R/142L can utilize the body pose information regarding the neck to determine body pose information for the right/left shoulders. In various implementations, different body pose information from different neural networks is combined to generate an overall body pose for the person. For example, in some implementations, the body pose information for the neck, shoulders, arms, torso, and legs is combined to provide an overall body pose of the person.

In some implementations, the neural network 200 includes a body pose regressor that regresses to the body pose information 230 by computing parameters of the body pose. In some implementations, the body pose regressor computes the position and/or the orientation for various joints. In some implementations, the body pose regressor computes the set of spatial coordinates and/or the set of angular coordinates for various body joints. In some implementations, the body pose selector 228 functions as a body pose regressor by computing the parameters of the body pose.

FIG. 2B illustrates a block diagram of an example neural network 250. In some implementations, the neural network 250 implements each one of the branched set of neural networks 140 . . . 152R. In various implementations, the neural network 250 receives the feature vector 252 and generates the body pose information 270 (e.g., the body pose information 172 shown in FIG. 1B and/or the body pose information 230 shown in FIG. 2A). In various implementations, the neural network 250 includes a convolutional neural network (CNN). To that end, the neural network 250 includes an input layer 260, convolution layers 262-1, 262-2, and 262-3, a non-linear layer 264, a pooling layer 266, and fully-connected layers 268-1, 268-2 and 268-3. In some implementations, the input layer 260, the convolution layers 262-1, 262-2, and 262-3, the non-linear layer 264, the pooling layer 266, and the fully-connected layers 268-1, 268-2 and 268-3 include respective neurons 260a, 262a-1, 262a-2, 262a-3, 264a, 266a, 268a-1, 268a-2, and 268a-3.

In the example of FIG. 2B, the neural network 250 includes three convolution layers 262-1, 262-2, and 262-3, and three fully-connected layers 268-1, 268-2, and 268-3. A person of ordinary skill in the art will appreciate from the present disclosure that, in some implementations, the neural network 250 includes fewer or more convolution and/or fully-connected layers. In some implementations, neural networks that model certain body portions (e.g., the neck and/or the shoulders) include more convolution and fully-connected layers, whereas neural networks that model other body portions (e.g., the lower arms and/or the lower legs) include fewer convolution and fully-connected layers. In some implementations, body portions closer to the head (e.g., the neck and/or the shoulders) are modeled by neural networks with more convolution/fully-connected layers (e.g., 3, 5, or more convolution/fully-connected layers), and body portions away from the head are modeled by neural networks with fewer convolution/fully-connected layers (e.g., 2 or 1 convolution/fully-connected layers).

Figure 3A:
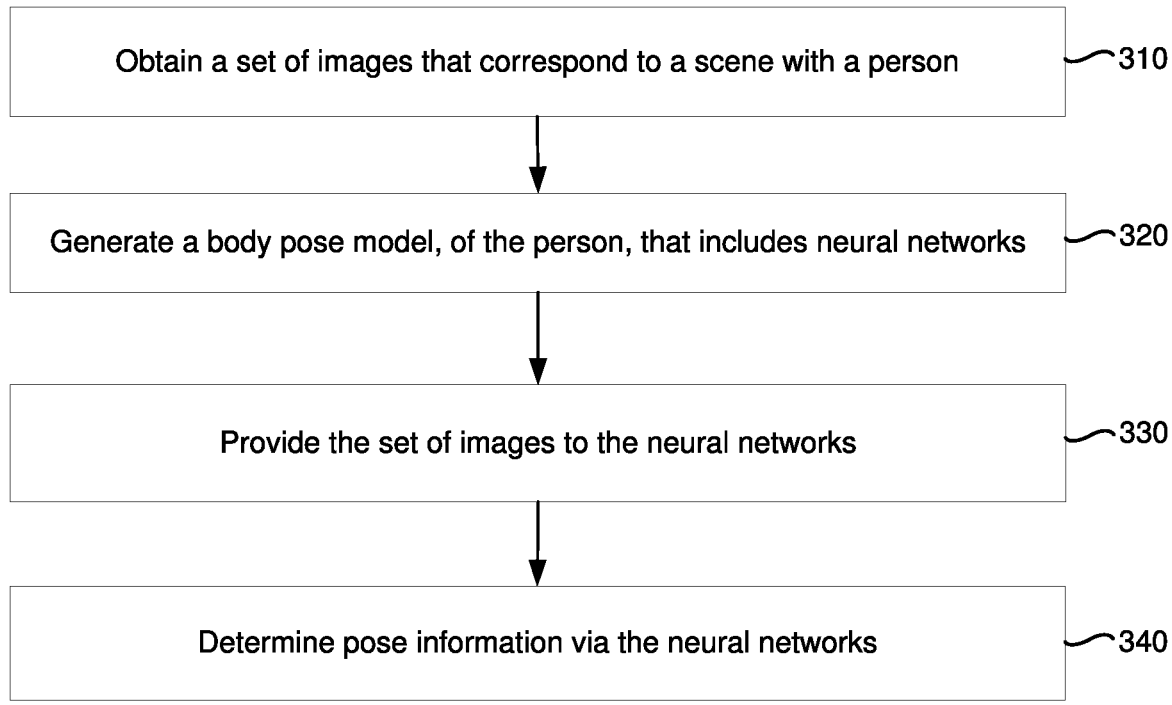
FIGS. 3A-3C are flowchart representations of a method of generating body pose information in accordance with some implementations.

FIG. 3A is a flowchart representation of a method 300 of generating body pose information for a person. In various implementations, the method 300 is performed by a device with a non-transitory memory, and one or more processors coupled with the non-transitory memory. In some implementations, the method 300 is performed by processing logic, including hardware, firmware, software, or a combination thereof. In some implementations, the method 300 is performed by a processor executing code stored in a non-transitory computer-readable medium (e.g., a memory). Briefly, in some implementations, the method 300 includes obtaining a set of images that correspond to a person, generating a body pose model that includes neural networks, providing the set of images to the neural networks, and determining pose information via the neural networks.

As represented by block 310, in various implementations, the method 300 includes obtaining a set of images (e.g., the set of images 164 shown in FIG. 1B) that correspond to a person. In some implementations, the method 300 includes obtaining a single image of the person. In some implementations, the method 300 includes obtaining multiple images of the person. In some implementations, the images correspond to the same field of view. For example, in some implementations, each image in the set is captured from the same field of view. Alternatively, in some implementations, the images correspond to different field of view. For example, in some implementations, some images are captured from a first field of view, whereas other images are captured from a second field of view (e.g., different from the first field of view).

As represented by block 320, in various implementations, the method 300 includes generating a body pose model of the person defined by a branched plurality of neural network systems (e.g., the body pose model shown in FIG. 1A defined by the branched set of neural networks 140 . . . 152R). In some implementations, each of the branched plurality of neural network systems models a respective portion of the person between a first respective body-joint and a second respective body-joint as dependent on at least an adjacent portion of the person sharing the first respective body-joint. For example, the neck neural network 140 models the neck of the person, the right shoulder neural network 142R models the right shoulder of the person, etc.

As represented by block 330, in various implementations, the method 300 includes providing the set of images of the respective portion to a first one of the branched plurality of neural network systems and a second one of the branched plurality of neural network systems. For example, referring to the example of FIG. 1B, the method 300 includes providing the set of images 164 to the neural networks 140 . . . 152R. In some implementations, the method 300 includes processing the images, and providing the processed images to the first one of the branched plurality of neural network systems and the second one of the branched plurality of neural network systems. For example, in some implementations, the method 300 includes passing the images through an image filter (e.g., to remove noise from the images). In some implementations, the method 300 includes cropping the images in order to arrive at images that include persons but not a significant portion of the environment surrounding the persons.

As represented by block 340, in various implementations, the method 300 includes determining, jointly by at least the first one and the second one of the plurality of neural network systems, pose information for the first respective body-joint and the second respective body-joint. For example, referring to the example of FIG. 1B, the method 300 includes determining jointly by the neural networks 140 . . . 152R the body pose information 172. In some implementations, the method 300 includes providing body pose information determined by one neural network system to other neural network systems that are downstream. For example, referring to the example of FIG. 1A, in some implementations, the method 300 includes providing the pose information for the neck determined by the neck neural network 140 to other downstream neural networks such as the right/left shoulder neural networks 142R/142L.

In some implementations, the method 300 includes rendering an avatar of the person based on the body pose information. For example, in some implementations, a pose of the avatar is set to a pose of the person indicated by the body pose information. In some implementations, the method 300 includes presenting a computer-generated reality (CGR) experience (e.g., an augmented reality (AR) experience, a virtual reality (VR) experience, a mixed reality (MR) experience) based on the body pose information. In some implementations, the method 300 includes shifting a scene (e.g., a CGR environment) in the CGR experience based on the body pose information. For example, as the person tilts his/her head upwards, the scene is shifted to downwards to display scene information in the upward direction.

Figure 3B:
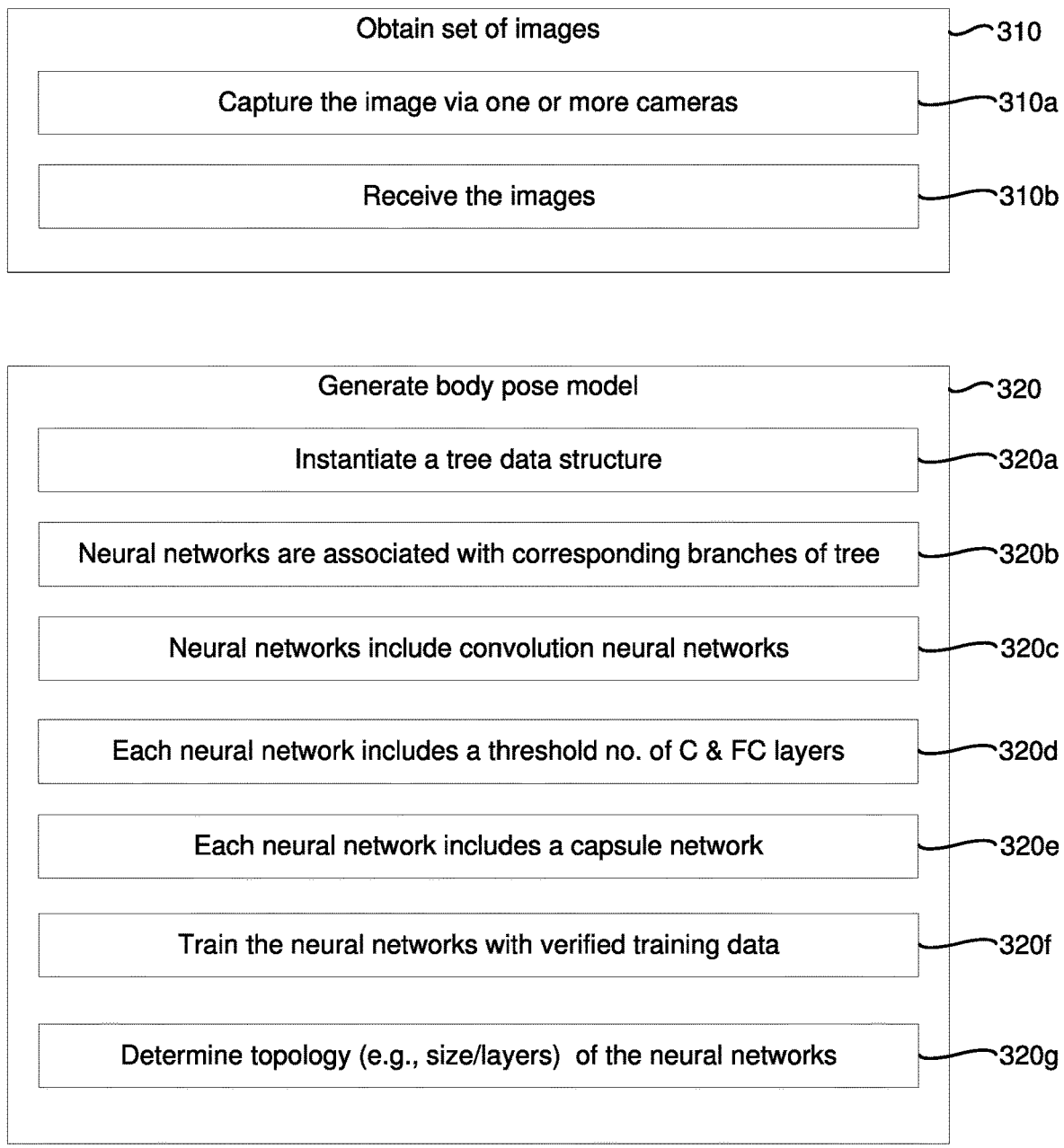

Referring to FIG. 3B, as represented by block 310a, in various implementations, the method 300 includes capturing the set of images via one or more cameras (e.g., capturing the set of images 164 via the cameras 162-1, 162-2 . . . 162-N shown in FIG. 1B). As represented by block 310b, in some implementations, the method 300 includes receiving the images at the device (e.g., receiving the images from another device that is located at the scene). For example, in some implementations, the method 300 includes receiving images from various cameras that are positioned within the scene.

As represented by block 320a, in some implementations, the method 300 includes instantiating a tree data structure (e.g., the tree data structure 100 shown in FIG. 1A). In some implementations, the tree data structure includes a root node (e.g., the head node 102 shown in FIG. 1A) that represents the head of the person. In some implementations, the tree data structure includes child nodes that represent joints of the person including one or more of a collar region, shoulder joints, elbow joints, wrist joints, pelvic joint, knee joints, ankle joints, and/or knuckles. For example, referring to FIG. 1A, the tree data structure 100 includes the collar region node 104, the right/left shoulder nodes 106R/106L, the right/left elbow nodes 108R/108L, the right/left wrist nodes 110R/110L, the pelvic node 112, the right/left knee nodes 114R/114L, and the right/left ankle nodes 116R/116L. A person of ordinary skill in the art will understand that, in some implementations, the method 300 includes instantiating a tree data structure with more or fewer nodes. For example, in some implementations, the method 300 includes instantiating the tree data structure with additional nodes that represent joints in the foot (e.g., toe joints) or hand (e.g., finger joints).

As represented by block 320b, in some implementations, the branched plurality of neural networks are associated with corresponding branches of the tree data structure. For example, referring to FIG. 1A, the neck neural network 140 is associated with the neck edge 120, the right/left shoulder neural networks 142R/142L are associated with the right/left shoulder edges, etc.

As represented by block 320c, in some implementations, each of the branched plurality of neural network systems includes a convolutional neural network (CNN). For example, referring to the example of FIG. 2B, the neural network 250 implements each of the neural networks 140 . . . 152R shown in FIGS. 1A-1B.

As represented by block 320d, in some implementations, each of the branched plurality of neural network systems includes a threshold number of convolution layers and the threshold number of fully-connected layers. For example, referring to the example of FIG. 2B, the neural network 250 includes three convolution layers 262-1, 262-2, and 262-3, and three fully-connected layers 268-1, 268-2, and 268-3. In some implementations, the branched plurality of neural network systems include different number of layers. For example, in some implementations, neural network systems that are associated with branches near the root node (e.g., the head node 102 shown in FIG. 1A) have more layers, whereas branches further away from the root node have fewer layers. For example, referring to the example of FIG. 1A, in some implementations, the neck neural network 140 has more than three or five layers, and the right/left lower leg neural networks 152R/152L have fewer than three layers.

As represented by block 320e, in some implementations, each of the branched plurality of neural networks includes a capsule network. A person of ordinary skill in the art will appreciate that, in some implementations, each of the branched plurality of neural networks includes a neural network other than convolution neural networks and capsule networks. For example, in some implementations, each of the branched plurality of neural networks includes recurrent neural networks (RNNs).

As represented by block 320f, in some implementations, the method 300 includes training the branched plurality of neural network systems during a training phase. In some implementations, the method 300 includes training the branched plurality of neural network systems with verified training data (e.g., images labeled with body poses). In some implementations, the method 300 includes training the neural network systems based on the body pose information generated by the neural network systems. For example, in some implementations, the method 300 includes adjusting the neural network weights/parameters based on the body pose information generated by the neural network systems.

As represented by block 320g, in some implementations, the method 300 includes determining respective topologies of the branched plurality of neural network systems. In some implementations, the method 300 includes determining one or more of respective sizes and respective layers of the branched plurality of neural network systems. In some implementations, the method 300 includes determining a number of convolution layers and/or a number of fully-connected layers for each neural network systems.

Figure 3C:
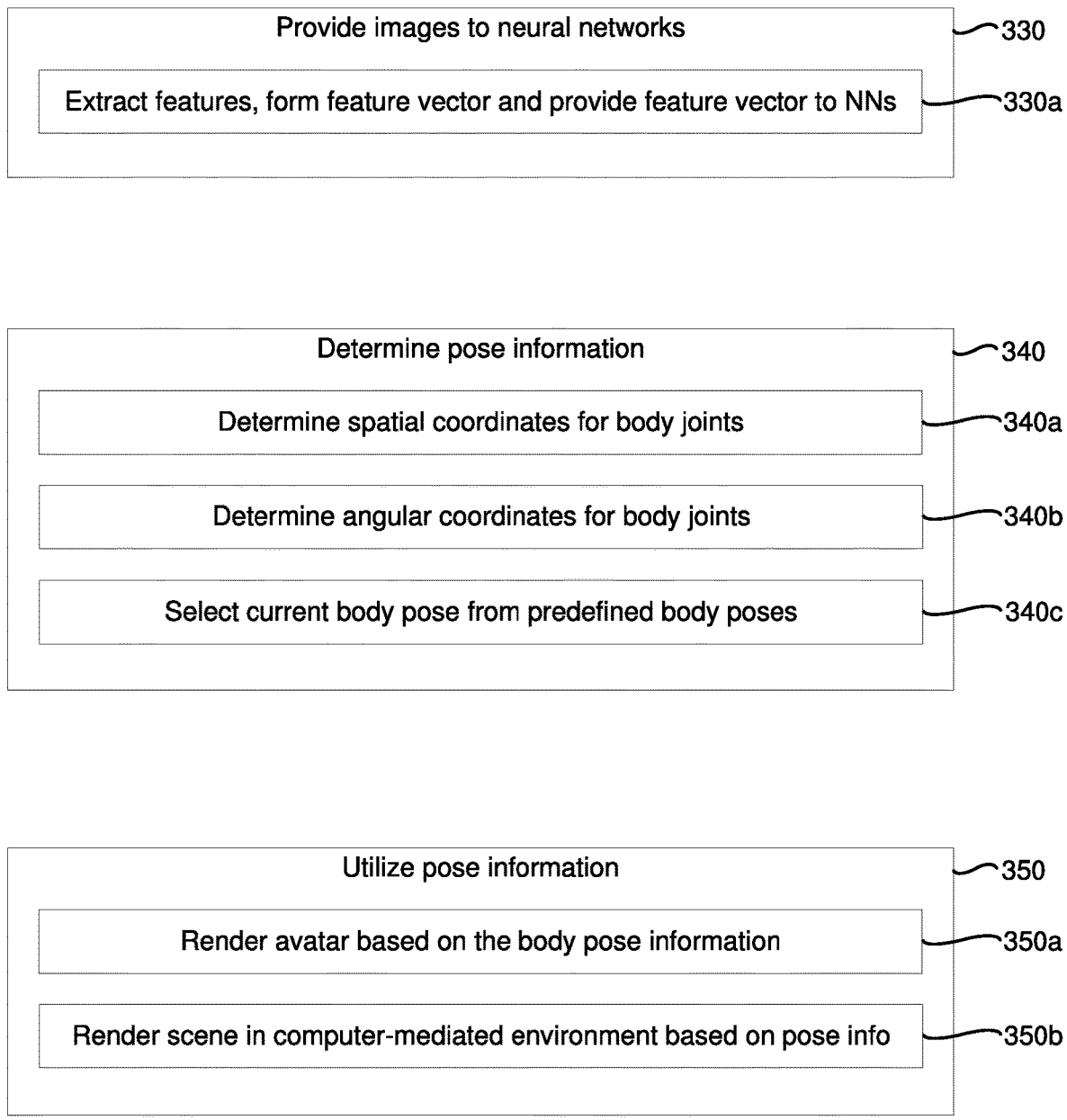

Referring to FIG. 3C, as represented by block 330a, in some implementations, the method 300 includes extracting features from the set of images, forming a feature vector (e.g., a stream of features) based on the features extracted from the set of images, and inputting the feature vector into the first one of the branched plurality of neural network systems. For example, referring to the example of FIG. 2A, the method 300 includes providing the feature vector 202 to the input layer 220 of the neural network 200.

As represented by block 340a, in some implementations, the method 300 includes determining a set of spatial coordinates for each body joint. For example, referring to the example of FIG. 1A, the method 300 includes determining the x, y, and z values for each joint. In some implementations, the method 300 includes determining the spatial coordinates with respect to the head.

As represented by block 340b, in some implementations, the method 300 includes determining a set of angular coordinates for each body joint. For example, referring to the example of FIG. 1A, the method 300 includes determining the $\alpha$, $\beta$, and $\gamma$ values for each joint. In some implementations, the method 300 includes determining angular coordinates with respect to the axis of the joint. In some implementations, the method 300 includes determining an orientation of each body joint. In some implementations, the set of spatial coordinates for a body joint and/or the set of angular coordinates for a body joint indicate an orientation of the body joint.

As represented by block 340c, in some implementations, the method 300 includes selecting a current body pose of the person from a plurality of predefined body poses. For example, referring to the example of FIG. 2A, the method 300 includes selecting one of the candidate body poses classified by the classification layer 226. For example, in some implementations, the method 300 includes selecting the candidate body pose that is associated with the highest probability or confidence measure.

As represented by block 350, in various implementations, the method 300 includes utilizing the body pose information. For example, as represented by block 350a, in some implementations, the method 300 includes rendering an avatar of the person based on the body pose information of the person. In some implementations, the method 300 includes setting a pose of the avatar to a pose of the person indicated by the body pose information. As such, in some implementations, the avatar has the same pose as the person. In some implementations, as the body pose of the user changes, the method 300 includes changing the pose of the avatar. As such, in some implementations, the avatar mimics the pose of the person.

As represented by block 350b, in some implementations, the method 300 includes rendering a scene in a CGR environment (e.g., in an AR environment, a VR environment or a MR environment) based on the body pose information. In some implementations, the method 300 includes shifting the scene based on a change in the body pose information. For example, if a change in the body pose information indicates that the person has tilted his/her head upwards, then the method 300 includes shifting the scene downwards.

Figure 4:
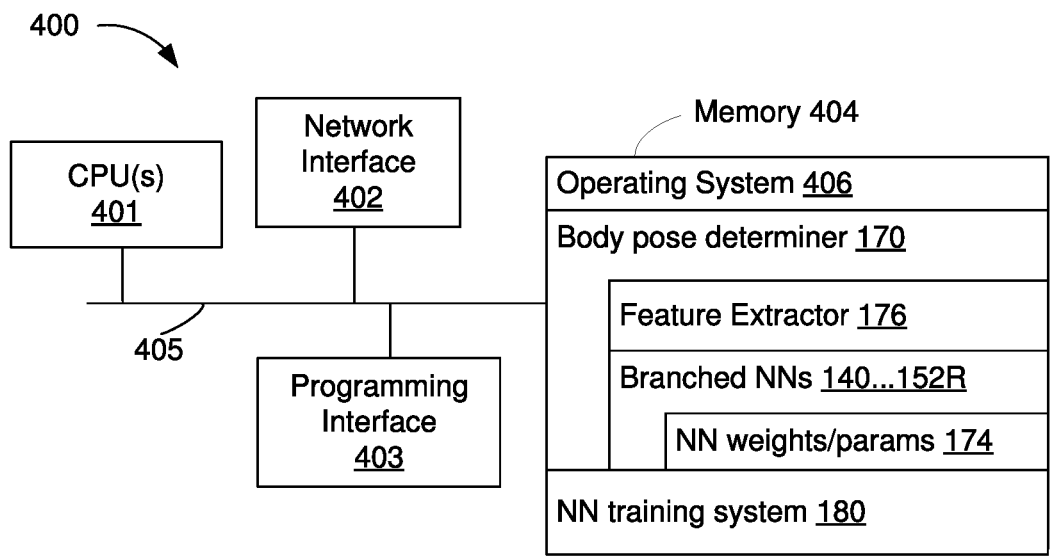
FIG. 4 is a block diagram of a device in accordance with some implementations.

FIG. 4 is a block diagram of a device 400 enabled with one or more components in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the CPU(s) 401. The memory 404 comprises a non-transitory computer readable storage medium.

Figure 5A:
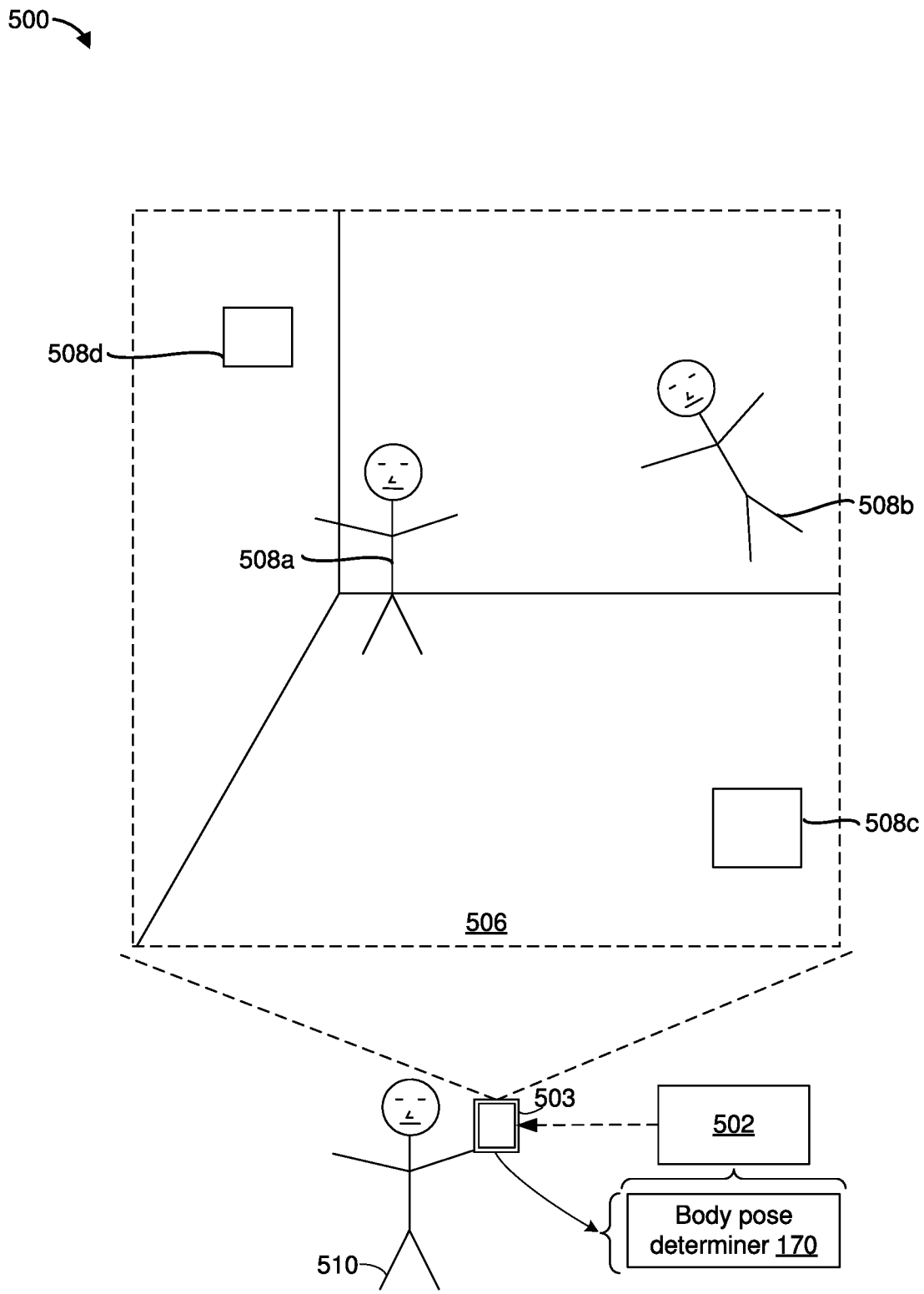
FIGS. 5A-5B are diagrams of example operating environments in accordance with some implementations.

In some implementations, the memory 404 or the non-transitory computer readable storage medium of the memory 404 stores the following programs, modules and data structures, or a subset thereof including an optional operating system 406, the body pose determiner 170, the feature extractor 176, the branched plurality of neural networks 140 . . . 152R, the neural network weights 174, and the neural network training system 180. Referring to FIG. 5A, an example operating environment 500 includes a controller 502 and an electronic device 503. In the example of FIG. 5A, the electronic device 503 is being held by a user 510. In various implementations, examples of the electronic device 503 include a smartphone, a tablet, a media player, a laptop, etc. In various implementations, the electronic device 503 presents a CGR environment 506 that includes various CGR objects 508a, 508b, 508c and 508d. In some implementations, the controller 502 and/or the electronic device 503 include (e.g., implement) the body pose determiner 170. In some implementations, the body pose determiner 170 determines a body pose of the user 150. In various implementations, the controller 502 and/or the electronic device 503 modify the CGR environment 506 based on the body pose determined by the body pose determiner 170.

Figure 5B:
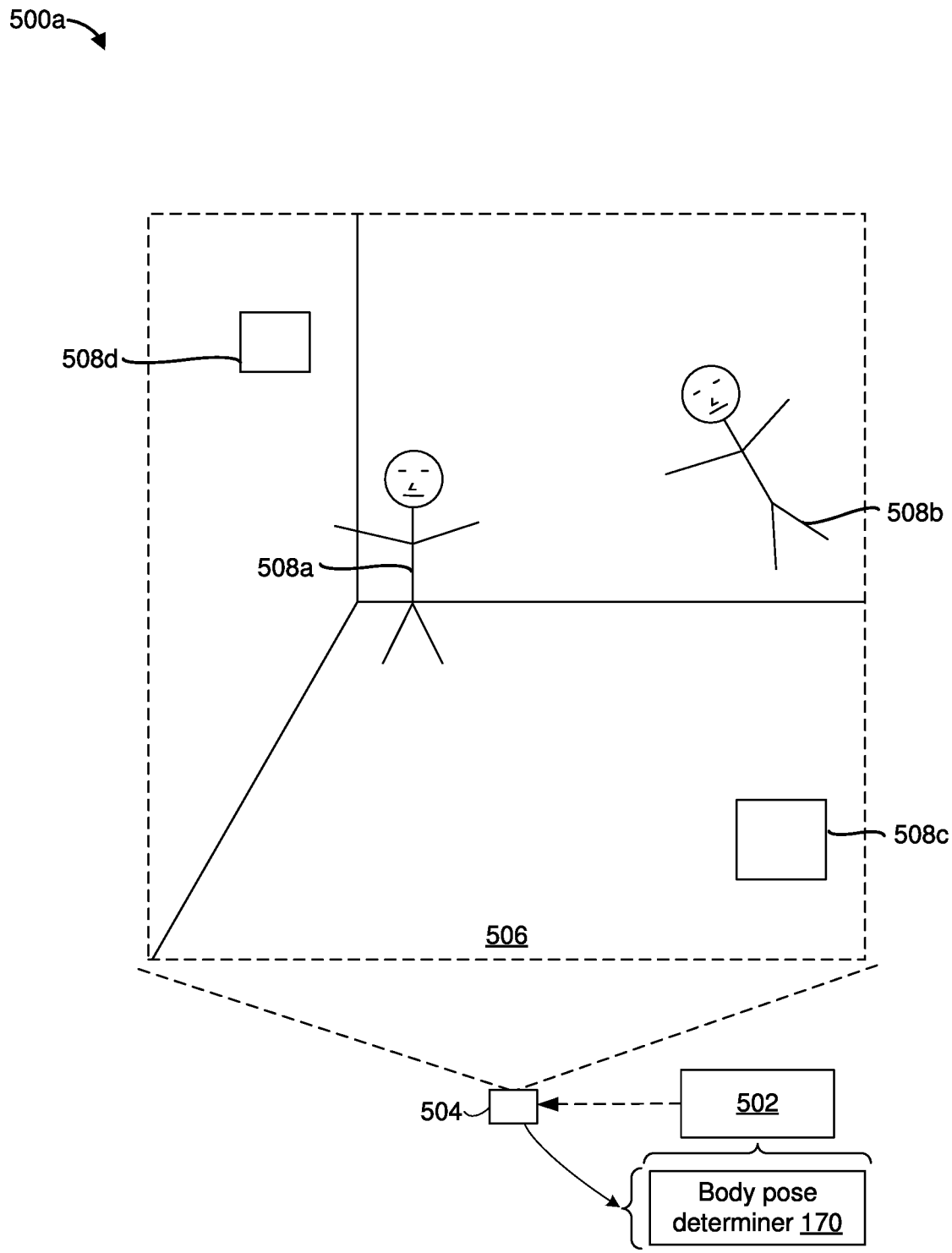

Referring to FIG. 5B, an example operating environment 500a includes the controller 502 and a head-mountable device (HMD) 504. In the example of FIG. 5B, the HMD 504, being worn by the user 510, presents (e.g., displays) the CGR environment 506 according to various implementations. In some implementations, the HMD 504 includes an integrated display (e.g., a built-in display) that displays the CGR environment 506. In some implementations, the HMD 504 includes a head-mountable enclosure. In various implementations, the head-mountable enclosure includes an attachment region to which another device with a display can be attached. For example, in some implementations, an electronic device can be attached to the head-mountable enclosure. In various implementations, the head-mountable enclosure is shaped to form a receptacle for receiving another device that includes a display (e.g., the electronic device). For example, in some implementations, the electronic device slides/snaps into or otherwise attaches to the head-mountable enclosure. In some implementations, the display of the device attached to the head-mountable enclosure presents (e.g., displays) the CGR environment 506. In various implementations, examples of the electronic device include smartphones, tablets, media players, laptops, etc. In some implementations, the controller 502 and/or the HMD 504 include the body pose determiner 170.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:
1. A method comprising:
 at a device including a non-transitory memory and one or more processors coupled with the non-transitory memory:
  obtaining a body pose model defined by a branched plurality of neural networks, wherein each of the branched plurality of neural networks models a respective portion of a body;

providing an image of the respective portion to a subset of the branched plurality of neural networks; and determining, by the subset of the branched plurality of neural networks, pose information for the respective portion of the body by selecting a current body pose from a plurality of predefined body poses.

2. The method of claim 1, wherein the body corresponds to a person, and wherein obtaining the body pose model comprises generating the body pose model by instantiating a tree data structure that includes:

a root node that represents a head of the person;

child nodes that represent joints of the person including one or more of a collar region, shoulder joints, elbow joints, wrist joints, pelvic joint, knee joints, ankle joints, and knuckles; and edges that represent portions of the person including one or more of a neck, shoulders, upper arms, lower arms, torso, upper legs, and lower legs.

3. The method of claim 2, wherein the subset of the branched plurality of neural networks includes:

a first one of the branched plurality of neural networks that is associated with a first one of the edges; and a second one of the branched plurality of neural networks that is associated with a second one of the edges.

4. The method of claim 1, wherein the respective portion of the body is between a first body joint and a second body joint, and wherein determining the pose information for the respective portion of the body comprises determining pose information for the first body joint and the second body joint.

5. The method of claim 4, wherein determining the pose information for the first body joint and the second body joint comprises:

determining a first set of spatial coordinates for the first body joint; and determining a second set of spatial coordinates for the second body joint.

6. The method of claim 4, wherein determining the pose information for the first body joint and the second body joint comprises:

determining a first set of angular coordinates for the first body joint; and determining a second set of angular coordinates for the second body joint.

7. The method of claim 1, wherein at least one of the branched plurality of neural networks includes a convolution neural network (CNN).

8. The method of claim 7, wherein the CNN includes a threshold number of convolution layers and a threshold number of fully connected layers.

9. The method of claim 1, wherein at least one of the branched plurality of neural networks includes a capsule network.

10. The method of claim 1, further comprising obtaining the image of the respective portion of the body.

11. The method of claim 10, wherein obtaining the image comprises:

capturing the image via an image sensor.

12. The method of claim 1, wherein providing the image to the subset of the branched plurality of neural networks comprises:

extracting features from the image;

forming a feature vector based on the features extracted from the image; and inputting the feature vector into the subset of the branched plurality of neural networks.

13. The method of claim 1, further comprising:

training the branched plurality of neural networks during a training phase by determining respective topologies of the branched plurality of neural networks.

14. The method of claim 13, wherein determining the respective topologies comprises:

determining one or more of respective sizes and respective layers of the branched plurality of neural networks.

15. The method of claim 1, further comprising:

rendering an avatar of the body in a graphical environment in accordance with the pose information, wherein a pose of the avatar is set based on the pose information.

16. The method of claim 15, further comprising:

changing the pose of the avatar in response to a change in the pose information of the body.

17. The method of claim 1, wherein the respective portion of the body is between a first body joint and a second body joint, and wherein the respective portion of the body is modeled as dependent on an adjacent portion of the body sharing the first body joint.

18. A device comprising:

one or more processors;

a non-transitory memory;

one or more cameras; and one or more programs stored in the non-transitory memory, which, when executed by the one or more processors, cause the device to:

obtain a body pose model defined by a branched plurality of neural networks, wherein each of the branched plurality of neural networks models a respective portion of a body;

provide an image of the respective portion to a subset of the branched plurality of neural networks; and determine, by the subset of the branched plurality of neural networks, pose information for the respective portion of the body by selecting a current body pose from a plurality of predefined body poses.

19. A non-transitory memory storing one or more programs, which, when executed by one or more processors of a device with a camera, cause the device to:

obtain a body pose model defined by a branched plurality of neural networks, wherein each of the branched plurality of neural networks models a respective portion of a body;

provide an image of the respective portion to a subset of the branched plurality of neural networks; and determine, by the subset of the branched plurality of neural networks, pose information for the respective portion of the body by selecting a current body pose from a plurality of predefined body poses.

20. The device of claim 18, wherein the body corresponds to a person, and wherein obtaining the body pose model comprises generating the body pose model by instantiating a tree data structure that includes:

a root node that represents a head of the person;

child nodes that represent joints of the person including one or more of a collar region, shoulder joints, elbow joints, wrist joints, pelvic joint, knee joints, ankle joints, and knuckles; and edges that represent portions of the person including one or more of a neck, shoulders, upper arms, lower arms, torso, upper legs, and lower legs.

21. The device of claim 18, wherein the respective portion of the body is between a first body joint and a second body joint, and wherein determining the pose information for the respective portion of the body comprises determining pose information for the first body joint and the second body joint.

22. The device of claim 18, wherein at least one of the branched plurality of neural networks includes a convolution neural network (CNN).

23. The non-transitory memory of claim 19, wherein at least one of the branched plurality of neural networks includes a capsule network.

24. The non-transitory memory of claim 19, wherein providing the image to the subset of the branched plurality of neural networks comprises:
   extracting features from the image;
   forming a feature vector based on the features extracted from the image; and
   inputting the feature vector into the subset of the branched plurality of neural networks.

25. The non-transitory memory of claim 19, wherein the one or more programs further cause the device to:
   train the branched plurality of neural networks during a training phase by determining respective topologies of the branched plurality of neural networks.

* * * * *